US008835010B2

(12) United States Patent
Sakamoto et al.

(10) Patent No.: US 8,835,010 B2

(45) Date of Patent: Sep. 16, 2014

(54) BELT MEMBER, FIXING DEVICE, AND IMAGE FORMING APPARATUS

(71) Applicants: Sadaaki Sakamoto, Tokyo (JP); Go Yamaguchi, Tokyo (JP); Akihiro Honya, Tokyo (JP)

(72) Inventors: Sadaaki Sakamoto, Tokyo (JP); Go Yamaguchi, Tokyo (JP); Akihiro Honya, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 26 days.

(21) Appl. No.: 13/706,395

(22) Filed: Dec. 6, 2012

(65) Prior Publication Data

US 2013/0149541 A1 Jun. 13, 2013

(30) Foreign Application Priority Data

Dec. 12, 2011 (JP) ................................ 2011-271131

(51) Int. Cl.

*B32B 27/40* (2006.01)
*G03G 15/20* (2006.01)
*C08G 18/67* (2006.01)

(52) U.S. Cl.

USPC .................... 428/423.1; 428/473.5; 399/302; 399/308; 399/333

(58) Field of Classification Search

USPC ........... 428/473.5, 423.1; 399/302, 308, 333; 528/75

See application file for complete search history.

(56) References Cited

U.S. PATENT DOCUMENTS 7,700,255 B2 * 4/2010 Kurachi et al. .......... 430/125.32
2010/0230650 A1 * 9/2010 Nagoh et al. .................. 252/586
2012/0301190 A1 * 11/2012 Tanaka .......................... 399/297

FOREIGN PATENT DOCUMENTS

JP 2005-031156 2/2005
JP 2009-069377 4/2009

* cited by examiner

*Primary Examiner* — Thao T. Tran

(74) *Attorney, Agent, or Firm* — Lucas & Mercanti, LLP

(57) ABSTRACT

Disclosed are a belt member having high wear resistance and thereby capable of maintaining its initial surface properties for a long period of time and a fixing device provided with, the belt member, and an image forming apparatus. The belt member has a belt shape, and its surface is formed of a cured resin including a structural unit derived from urethane (meth)acrylate (A) having at least three (meth)acryloyloxy groups per molecule, a structural unit derived from a polyfunctional monomer (B) having no urethane bond and having at least three (meth)acryloyloxy groups per molecule, and a structural unit derived from a fluorine-modified acrylate (C). The cured resin contains 18 to 63% by mass of the structural unit derived from the urethane(meth)acrylate (A), 18 to 63% by mass of the structural unit derived from the polyfunctional monomer (B), and 10 to 40% by mass of the structural unit derived from the fluorine-modified acrylate(C).

8 Claims, 2 Drawing Sheets

BELT MEMBER, FIXING DEVICE, AND IMAGE FORMING APPARATUS

CROSS REFERENCE TO RELATED APPLICATION

This Application claims the priority of Japanese Patent Application No. 2011-271131 filed on Dec. 12, 2011 and which is incorporated by reference herein.

TECHNICAL FIELD

The present invention relates to a belt member, a fixing device, and an image forming apparatus provided with the belt member and the fixing device.

BACKGROUND ART

In an electrophotographic image forming method, examples of surface properties required for belt members such as a fixing belt and an intermediate transfer belt include: low surface energy necessary for preventing extraneous materials from adhering to the surfaces of the belt members during separation of an image supporting medium supporting a toner image or a fixed image obtained, by fixing the toner image; wear resistance under frictional stress and separation stress; and long service life (see, for example. Patent Literatures 1 and 2).

CITATION LIST

Patent Literature

Patent Literature 1; Japanese Patent Application Laid-Open No. 2009-69377

Patent Literature 2: Japanese Patent Application Laid-Open No. 2005-31156

SUMMARY OF INVENTION

Technical Problem

One possible method for imparting low-energy characteristics (releasability) to a belt member is to coat the surface of the belt member with a low-energy component such as F or Si. However, such a low-energy component has a property that it is segregated on the surface. Therefore, when the surface of the belt member is worn due to frictional stress and separation stress, the low-energy component is worn away rapidly, and it is difficult to maintain the initial surface properties.

The present invention has been made in view of the foregoing circumstances and has as its object the provision of a belt member having high wear resistance and thereby capable of maintaining its initial surface properties for a long period, of time, a fixing device including the same, and an image forming apparatus including same.

Solution to Problem

The present inventors have carried out an extensive investigation and found that high wear resistance can be achieved when the surface of a belt member is formed of a cured resin containing several types of specific structural units at a specific ratio. Thus, the present invention has been completed.

A belt member of the present invention is a belt member included in an electrophotographic image forming apparatus, the belt member comprising:

a surface formed of a cured resin including a structural unit derived from methane(meth)acrylate (A) having at least three (meth)acryloyloxy groups per molecule, a structural unit derived from a polyfunctional monomer (B) having no urethane bond and having at least three (meth)acryloyloxy groups per molecule, and a structural unit derived from a fluorine-modified acrylate (C), wherein the cured resin contains 18 to 63% by mass of the structural unit derived from the urethane(meth)acrylate (A), 18 to 63% by mass of the structural unit derived from the polyfunctional monomer (B), and 10 to 40% by mass of the structural unit derived from the fluorine-modified acrylate (C).

In the belt member of the present invention, the urethane (meth)acrylate (A) may preferably be obtained, by reacting a polyol compound (a1) having at least two hydroxyl groups per molecule, a polyisocyanate compound (a2), and an acrylate compound (a3) having a hydroxyl group and an acryloyloxy group per molecule.

In the belt member of the present invention, the polyol compound (a1) may preferably be a cyclic alcohol having a skeleton formed of an alicyclic hydrocarbon.

In the belt member of the present invention, the fluorine-modified acrylate (C) may preferably have an average molecular weight of 10,000 or larger.

The belt member of the present invention may preferably further comprise; a belt base having a belt shape and formed of a polyimide resin; and a surface layer formed on the belt base, the surface layer being formed of the cured resin.

A fixing device of the present invention comprises a fixing belt and a pressure roller that are disposed in pressure contact with each other to form a fixing nip portion, wherein the fixing belt includes the above-described belt member.

An image forming apparatus of the present invention comprises the above-described fixing device.

An image forming apparatus of the present invention comprises: an image carrier; an intermediate transfer belt that moves in a circulating manner; a primary transfer unit for transferring a toner image electrostatically formed on the image carrier onto the intermediate transfer belt to form an intermediate toner image; and a secondary transfer unit for transferring the intermediate toner image formed on the intermediate transfer belt onto a transfer medium, wherein the intermediate transfer belt includes the above-described belt member.

Advantageous Effects of Invention

In the belt member of the present, invention, its surface is formed of a specific cured resin containing a structural unit derived from urethane (meth)acrylate (A), a structural unit derived from, a polyfunctional monomer (B), and a structural unit derived from a fluorine-modified acrylate (C) at a specific ratio. Therefore, in this belt member, elasticity resulting from the urethane(meth) acrylate (A) and hardness resulting from the polyfunctional monomer (B) are well balanced, so that high toughness can foe achieved. This provides wear resistance under frictional stress and separation stress. Therefore, even after the belt member is used for a long period of time, low-energy characteristics resulting from the fluorine-modified acrylate (C) are not greatly impaired, and the initial surface characteristics are thereby maintained for a long period of time.

DESCRIPTION OF EMBODIMENTS

Figure 1:
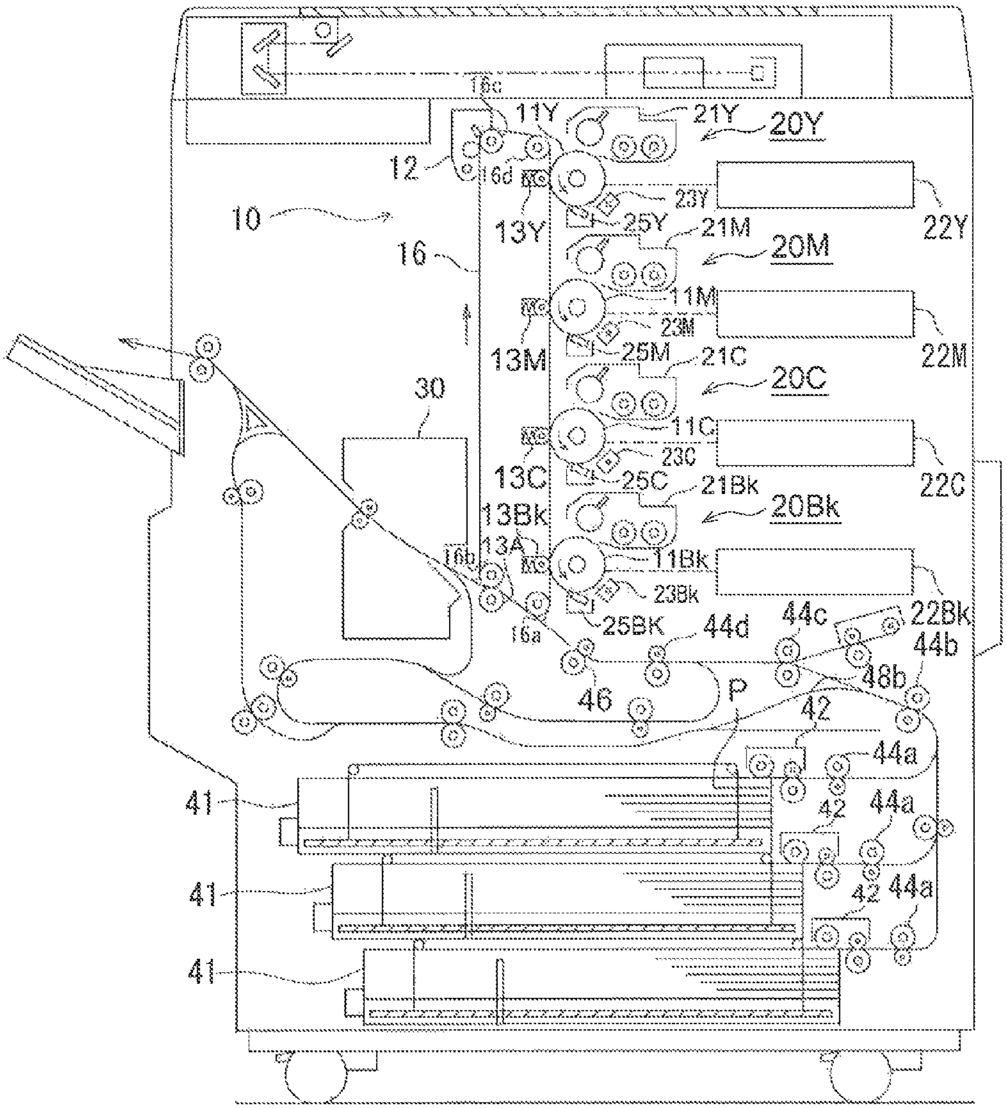
[FIG. 1] is a cross-sectional view illustrating an example of the configuration of an image forming apparatus of the present invention.

The present invention will next, be specifically described.

The belt member of the present invention has a belt shape and is included in an electrophotographic image forming apparatus. The surface of the belt member is formed of a specific cured resin containing a structural unit derived from urethane(meth)acrylate (A) having at least three (meth)acryloyloxy groups per molecule, a structural unit derived from a polyfunctional monomer (B) having no urethane bond and having at least three (meth)acryloyloxy groups per molecule, and a structural unit derived from a fluorine-modified acrylate (C). In the specific cured resin, the content of the structural unit derived from the urethane(meth)acrylate (A), the content of the structural unit derived from the polyfunctional monomer (B), and the content of the structural unit derived from the fluorine-modified acrylate (C) are within specific ranges.

In the present invention, the belt member is a member having a belt shape and comes into contact with an image supporting medium and/or a toner during image formation.

[Urethane(meth)acrylate (A)]

No particular limitation is imposed on the urethane(meth) acrylate (A) used, so long as it is a compound having a urethane bond and at least three (meth)acryloyloxy groups per molecule.

As the urethane(meth)acrylate (A), may be mentioned a compound having a urethane bond in its main chain and having at least three (meth)acryloyloxy groups each bonded to a terminal of the main chain or a side chain.

Specific examples of the urethane(meth)acrylate (A) include: a reaction product of a polyol compound (a1) having at least two hydroxyl groups per molecule, a polyisocyanate compound (a2), and an acrylate compound (a3) having a hydroxyl group and an acryloyloxy group per molecule; and a reaction product of the polyisocyanate compound (a2) and the acrylate compound (a3) having a hydroxyl group and an acryloyloxy group per molecule.

The reaction product of the polyol compound (a1), the polyisocyanate compound (a2), and the acrylate compound (a3) can be obtained by reacting the polyol compound (a1) with the polyisocyanate compound (a2) to produce a so-called urethane prepolymer having isocyanate groups acid then reacting the urethane prepolymer with the acrylate compound (a3).

More specifically, first, the polyol compound (a1) and the polyisocyanate compound (a2) are mixed in such a ratio that the amount of isocyanate group is in excess and are allowed to react in the same manner as in an ordinary urethane prepolymer synthesis process to produce a urethane prepolymer. In this reaction, the equivalent ratio of the isocyanate groups to the hydroxyl groups is preferably 1.2 to 2.5, more preferably 1.5 to 2.2, Then the isocyanate groups in the obtained urethane prepolymer are allowed to react with the hydroxyl group in the acrylate compound (a3) to produce urethane(meth)acrylate (A).

The reaction product of the polyisocyanate compound (a2) and the acrylate compound (a3) can be obtained, by reacting the isocyanate groups in the polyisocyanate compound (a2) with the hydroxyl group in the acrylate compound (a3).

(Polyol Compound (a1))

No particular limitation is imposed on the polyol compound (a1) used, so long as it has at least two hydroxyl groups. Examples of such a polyol compound include: high-molecular weight polyols such as polyether polyols and polyester polyols; and low-molecular weight polyols such as triethylene glycol and 1,6-hexanediol. These may be used either singly or in any combination thereof.

A polyol compound (a1) having a molecular weight of 500 or lower is preferably used because it has high curability and can provide a specific surface layer with improved hardness. Particularly, a low-molecular weight polyol having a skeleton formed of an alicyclic hydrocarbon, i.e., a low-molecular weight cyclic alcohol, is more preferably used because it can provide a specific surface layer with further improved hardness.

Specific examples of the low-molecular weight cyclic alcohol include 1,4-cyclohexanediol and tricyclodecane dimethanol.

(Polyisocyanate compound (a2))

No particular limitation is imposed on the polyisocyanate compound (a2) used, so long as it has at least two isocyanate groups per molecule.

Specific examples of the polyisocyanate compound include aromatic polyisocyanates such as TDIs (for example, 2,4-tolylene diisocyanate (2,4-TDI) and 2,6-tolylene diisocyanate (2,6-TDI)), MDIs (for example, 4,4'-phenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethyl xylylene diisocyanate (TMXDI), tolidine diisocyanate (TODI), 1,5-naphthalene diisocyanate (NDI), and triphenylmethane triisocyanate; aliphatic polyisocyanates such, as hexamethylene diisocyanate (HDI), trimethyl hexamethylene diisocyanate (TMHDI), lysine diisocyanate, and norbornane diisocyanate (NBDI); alicyclic polyisocyanates such as trans-cyclohexane-1,4-diisocyanate, isophorone diisocyanate (IPDI), bis(isocyanatomethyl)cyclohexane ($H_6$XDI), and dicyclonexylmethane diisocyanate ($H_{12}$MDI); carbodiimide-modified polyisocyanates obtained from the above isocyanates; and isocyanurate modified polyisocyanates obtained from the above isocyanates.

Of these, tolylene diisocyanate (TDI) is preferably used because it can reduce the viscosity of a specific polymerizable composition described later and can provide good application properties(workability).

These polyisocyanate compounds may be used either singly or in any combination thereof.

(Acrylate Compound (a3))

No particular limitation is imposed on the acrylate compound (a3) used, so long as it is an acrylate having a hydroxyl group and an acryloyloxy group per molecule.

A polyfunctional acrylate compound having at least two acryloyloxy groups is preferably used as the acrylate compound (a3), in order for the urethane (meth)acrylate (A) obtained to have at least three acryloyloxy groups.

Specific examples of such a polyfunctional acrylate compound include trimethylolpropane diacrylate, pentaglycerol diacrylate, pentaerythritol triacrylate, dipentacrythritol triacrylate, and dipentacrythritol tetraacrylate.

In the specific cured resin in the present invention, the content of the structural, unit, derived from the urethane (meth)acrylate (A) is 18 to 63% by mass, preferably 40 to 55% by mass.

When the content of the structural unit derived from the urethane(meth)acrylate (A) in the specific cured resin is within the above range, the specific surface layer has sufficient toughness, and high wear resistance can be achieved. If the content of the structural unit derived from the urethane (meth)acrylate (A) is less than 18% by mass, the toughness of the surface layer obtained is insufficient, and the surface layer is brittle, so that the wear resistance is not satisfactory. When the content exceeds 63% by mass, the surface layer obtained does not have sufficient hardness, and its wear resistance is low.

[Polyfunctional Monomer (B)]

No particular limitation is imposed on the polyfunctional monomer (B) used. Any compound having no urethane bond and having at least three (meth)acryloyloxy groups per molecule, i.e., a compound having at least three (meth)acryloyloxy groups per molecule and other than the urethane(meth) acrylate (A), can be used.

Specific examples of a polyfunctional monomer having three (meth)acryloyloxy groups per molecule include trimethylolpropane tri(meth)acrylate, pentaerythritol tri(meth) acrylate, and dipentacrythritol tri(meth)acrylate.

Specific examples of a polyfunctional monomer having four (meth)acryloyloxy groups per molecule include pentaerythritol tetra(meth)acrylate, dipentacrythritol tetra(meth) acrylate, and tripentacrythritol tetra(meth)acrylate, Specific examples of a polyfunctional monomer having at least five(meth)acryloyloxy groups per molecule include dipentacrythritol penta(meth)acrylate, dipentacrythritoi hexa (meth)acrylate, tripentacrythritol penta(meth)acrylate, tripentaerythritoi hexa(meth)acrylate, tripentaerythritoi hepta (meth)acrylate, and tripentaerythritoi octa(meth)acrylate.

Of these, a polyfunctional monomer having three (meth) acryloyloxy groups per molecule is preferably used because the viscosity of the specific polymerizable composition described later can be reduced and the adhesion of the specific surface layer obtained from the specific polymerizable composition to a belt base is further improved. A polyfunctional monomer having three acryloyloxy groups per molecule is more preferably used.

Trimethylolpropane triacrylate, pentacrytnitrol tetraacrylate, dipentacrythritol tetra(meth)acrylate, or a compound represented by the following formula (b1) is preferably used because they have fast curability, high water resistance, high solvent resistance, and nigh chemical resistance, and the hardness of the specific surface layer obtained and its adhesion to the belt base are further improved.

The compound represented by the following formula (b1) is more preferably used because it has high curability and the hardness of the specific surface layer obtained is further improved.

The above polyfunctional monomers (B) may be used either singly or in any combination thereof.

Formula (b1)

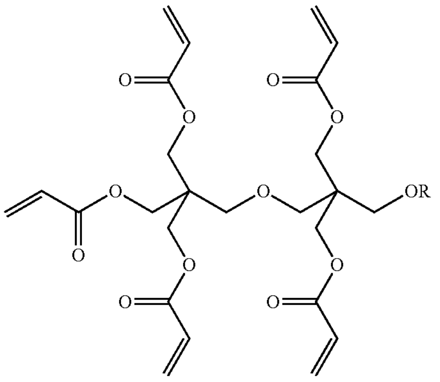

(wherein R represents a hydrogen atom or a (meth)acryloyl group.)

In the specific cured resin according to the present invention, the content of the structural unit derived from the polyfunctional monomer (B) is 18 to 63% by mass, preferably 30 to 40% by mass.

When the content of the structural unit derived, from the polyfunctional monomer (B) in the specific cured resin is within the above range, the specific surface layer has appropriate hardness, and its adhesion to the belt base is satisfactory. If the content of the structural unit derived from the polyfunctional monomer (B)is less than 18% by mass,the surface layer to be obtained does not have sufficient hardness and has low wear resistance. If the content exceeds 63% by mass, the surface layer to be obtained is brittle, and sufficient wear resistance cannot be obtained.

[Fluorine-modified acrylate (C)]

As the fluorine-modified acrylate (C), may be mentioned a combination of a fluorine-modified acrylate resin and a component, examples of which include: copolymers of respective types or plural types of monomers including fluorinated olefin monomers such as tetrafluoroethylene,vinylidene fluoride, hexafluoropropylene, and a fluorinated vinyl ether; and non-fluorine-modified acrylate resins such as ordinary acrylate-based monomers including alkyl esters, for example, methyl, ethyl, butyl, octyl, and dodecyl esters, of (meth) acrylic acid, hydroxyalkyl esters such as hydroxyethyl and hydroxybutyl, and a glycidyl ester, For example, a copolymer prepared using tetrafluoroethylene and hexafluoropropylene as fluorinated olefin monomers and having an average molecular weight of 10,000 or larger is preferably used as the fluorine-modified acrylate (C) because F serving as a low-energy component can be introduced to a certain depth from the outermost surface and therefore the initial performance can be maintained even after the outermost surface is worn away.

In the specific cured resin according to the present invention, the content of the structural unit derived from the fluorine-modified acrylate (C) is 10 to 40% by mass, preferably 20 to 30% by mass.

When the content of the structural unit derived, from the fluorine-modified acrylate (C) is within the above range, she specific surface layer has sufficient releasability. If the content of the structural unit derived from the fluorine-modified acrylate (C) is lower than 10% by mass, the specific surface layer does not exhibit sufficient releasability. If the content exceeds 40% by sass, the surface layer obtained does not have sufficient hardness and toughness, and therefore sufficient wear resistance cannot be obtained. In addition, the application properties of the specific polymerizable composition described later become low, and the specific surface layer may not be formed.

The belt member of the present invention may include a belt base having a belt shape and a surface layer formed on the belt base and formed of the above-described specific cured, resin.

Examples of the belt base include a belt base formed, of a polyimide resin, a polymethyl methacrylate resin, a polycarbonate resin, a polystyrene resin, an acrylonitrile-styrene copolymer resin, a polyvinyl chloride resin, an acetate resin, an ABS resin, a polyester resin, or a polyamide resin. A belt base formed of a polyimide resin is preferably used, The thickness of the surface layer in the belt member varies depending on the application of the belt member but, for example, is preferably 1 to 30 μm. If the thickness of the surface layer is smaller than 1 μm, the effect of preventing surface deterioration of the belt base may not be sufficiently obtained. If the thickness of the surface layer exceeds 30 μm, sufficient adhesion of the surface layer to the belt base is not obtained, and cracks may occur.

Examples of a method of producing the belt member in the present invention include a method including: coating the belt base with a specific polymerizable composition containing polymerizable components for forming the above-described specific cured resin including the urethane(meth)acrylate (A), the polyfunctional monomer (B), and the fluorine-modified acrylate (C), a polymerization initiator (D), and other optional components such as a solvent to thereby form a coating; and irradiating the coating with light to cure the coating.

[Polymerization Initiator (D)]

No particular limitation is imposed on the polymerization initiator (D) included in the specific polymerizable composition, so long as the polymerization initiator (D) can polymerize the urethane(meth)acrylate (A), the polyfunctional monomer: (B), and the fluorine-modified acrylate (C) through light or neat.

Examples of the usable polymerization initiator (D) include photopolymerization initiators such as acetophenone-based compounds, benzoin ether-based compounds, benzophenone-based compounds, sulfur compounds, azo compounds, peroxide compounds, and phosphine oxide-based compounds.

Specific examples of the polymerization initiator(D) include: carbonyl compounds such as benzoin, benzoin methyl ether, benzoin ethyl ether, benzoin isopropyl ether, acetoin, butyroin, toluoin, benzil, benzophenone, p-methoxybenzophenone, diethoxyacetophenone, α,α-dimethoxy-α-phenylacetopnenone, methyl phenyl glyoxylate, ethyl phenyl glyoxylate, 4,4'-bis(dimethylaminobenzophenone), 2-hydroxy-2-methyl-1-phenylpropane-1-one, 2,2-dimethoxy-1,2-diphenylethane-1-one, and 1-hydroxycyclohexyl phenyl ketone; sulfur compounds such as tetramethylthiuram monosulfide and tetramethylthiuram disulfide; azo compounds such as azobisisobutyronitrile and azobis-2,4-dimethylvalero; and peroxide compounds such as benzoyl peroxide and di-t-butyl peroxide. These may be used either singly or in any combination thereof.

Of these, 1-hydroxycyciohexyl phenyl ketone, 2-hydroxy-2-methyl-1-phenyl-propane-1-one, and 1-[4-(2-hydroxyethoxy)-phenyl]-2-hydroxy-2-methyl-1-propane-1-one are preferably used,from, the viewpoint of their photo stability, nigh photocleavage efficiency, surface curability, compatibility with the specific cured resin, low volatility, and low odor characteristics.

The content of the photopolymerization initiator (D) in the specific polymerizable composition is preferably 1 to 10% by mass. The content is more preferably 2 to 8% by mass, still more preferably 3 to 6% by mass because high curability can be obtained and the specific surface layer obtained can have suffficent hardness and can also have high adhesion to the belt base.

Preferably, the specific polymerizable composition contains a solvent because it can provide high application properties(workability).

Specific examples of the solvent include ettanol, isopropanol, butanol, toluene, xylene, acetone, methyl ethyl ketone, ethyl acetate, and butyl acetate.

The specific polymerizable composition may contain various additives such as a filler, an age resistor, an antistatic agent, a flame retardant, a tackifier, a dispersing agent, an antioxidant, an antifoaming agent, a leveling agent:, a matting agent, and a photo stabilizer (such as a hindered amine-based compound) and other components such as a dye and a pigment, insofar as the object of the present invention is not impaired.

Specific examples of the filler include organic and inorganic fillers such as pyrophyllite clay, kaolin clay, fired clay, fumed silica, fired silica, precipitated silica, pulverized silica, fused silica, diatomaceous earth, iron oxide, zinc oxide, titanium oxide, barium oxide, magnesium, oxide, calcium carbonate, magnesium carbonate, zinc carbonate, and carbon black; products obtained by treating the above fillers with a fatty acid, a resin acid, or a fatty acid ester; and products obtained by treating the above fillers with a fatty acid ester urethane compound, Specific examples of the age resistor include hindered phenol-based compounds and hindered amine-based compounds.

Specific examples of the antioxidant include butylhydroxytoluene (BHT) and butylhydroxyanisole (BHA).

Specific examples of the antistatic agent include quaternary ammonium salts and hydrophilic compounds such, as polyglycols and ethylene oxide derivatives.

Specific examples of the flame retardant include chloroalkyl phosphates, dimethyl methylphosphoriate, bromine-phosphorus compounds, ammonium polyphosphates, neopencyl bromide-polyethers, and brominated polyethers.

Specific examples of the tackifier include terpene resins, phenolic resins, terpene-phenolic resins, rosin resins, xylene resins, and epoxy resins.

Specific examples of the leveling agent include silicone-based leveling agents, acrylic-based leveling agents, vinyl-based leveling agents, and fluorine-bases leveling agents.

For example, the specific polymerizable composition can be prepared by sufficiently mixing the essential components and optional components under reduced pressure using an agitator such as a mixer.

No particular limitation is imposed on a method of coating the belt base with the specific polymerizable composition. For example, any publicly known coating method such as a brushing method, a flow coating method, an immersion coating method, a spray coating method, or a spin coating method can be used.

The amount of the specific polymerizable composition applied is controlled such that the specific surface layer obtained has a prescribed thickness, Examples of a method of curing the specific polymerizable composition include a method in which, heat is applied and a method in which light, such as UV light is applied.

When the specific polymerizable composition is cured by heat,it can be heated at, for example, 80 to 120° C.

When the specific polymerizable composition is cured by irradiation with UV light, the amount of UV irradiation is preferably 500 to 3,000 in mJ/$cm^2$ from the viewpoint of fast curability and workability.

The temperature when the specific polymerizable composition is cured by irradiation with UV light is preferably 20 to 80° C.

No particular limitation is imposed on an apparatus used to apply UV light, and any publicly known apparatus can be used.

When a coating prepared, by application of the specific polymerizable composition is dried,the solvent, therein is removed.

The coating may be dried before, during, or after polymerization of the polymerizable components, or any suitable combination of drying before polymerization, drying during polymerization, and drying after polymerization may be selected. More specifically, it is preferable to perform primary drying until the coating does not exhibit flowability, polymerize the polymerizable components, and then perform secondary drying to control the amount of volatile materials in a protective layer to a prescribed amount.

A method of drying the coating can be appropriately selected according to the type of the solvent, the thickness of the protective layer to be formed, etc. For example, the drying temperature is preferably 40 to 100° C., more preferably about 60° C. For example, the drying time is preferably 1 to 5 minutes, more preferably about 3 minutes.

The above described belt member has a surface formed of the specific cured resin. Therefore, this belt member is well-balanced between elasticity resulting from the urethane (meth)acrylate (A) and hardness resulting from the polyfunctional monomer (B) and exhibits high toughness, and wear resistance under frictional stress and separation stress is thereby achieved. Accordingly, even after the belt member is used for a long period of time, the low-energy characteristics resulting from the fluorine-modified acrylate (C) are not greatly impaired, and the initial surface properties are thereby maintained for a long period, of time.

The specific cured resin in the belt member of the present invention can also be suitably used for a surface layer of a roller member having a roller shape such as a fixing roller.

The above-described belt member can be suitably used as intermediate transfer belts in various publicly known electrophotographic image forming apparatuses such as monochrome image forming apparatuses and full-color image forming apparatus and as a fixing belt in a fixing device, FIG. 1 is a cross-sectional view illustrating an example of the configuration of the image forming apparatus of the present invention, This image forming apparatus is a tandem-type color image forming apparatus that can continuously perform, image formation processing and gloss processing for a toner layer.

The image forming apparatus includes: color toner image forming units 20Y, 20M, 20C, and 20Bk for forming yellow, magenta, cyan, and black color toner images respectively; an intermediate transfer unit 10 for transferring toner images formed by the color toner image forming units 20Y, 20M, 20C, and 208k onto an image supporting medium P; and a fixing device 30 for performing fixing processing in which the toner images are fixed by applying pressure to the image supporting medium P under heating to obtain toner layers.

In the color toner image forming unit 20Y, a yellow toner image is formed. In the color toner image forming unit 20M, a magenta toner image is formed. In the color toner image forming unit 20C, a cyan toner image is formed. In the color toner image forming unit 20Bk, a black toner image is formed.

The color toner image forming units 20Y, 20M, 20C, and 20Bk include photosensitive elements 11Y, 11M, 11C, and 11Bk serving as static latent image carriers, charging units 23Y, 23M,23C, and 23Bk for applying a uniform potential to the respective surfaces of the photosensitive elements 11Y, 11M, 11C, and 11Bk, exposure units 22Y, 22M, 22C, and 22Bk for forming desired static latent images on the uniformly charged photosensitive elements 11Y, 11M, 11C, and 11Bk, developing units 21Y, 21M, 21C, and 21Bk for conveying color toners to the photosensitive elements 11Y, 11M, 11C,and 11Bk to visualize the static: latent images,and cleaning units 25Y,25M,25C, and 25Bk for collecting toners remaining on the photosensitive elements 11Y, 11M, 11C, and 11Bk after primary transfer,respectively.

The intermediate transfer unit 10 includes an intermediate transfer belt 16, primary transfer rollers 13Y, 13M, 13C, and

13Bk for transferring the color toner images formed by the color toner image forming units 20Y, 20M, 20C, and 20Bk onto the intermediate transfer belt 16, a secondary transfer roller 13A for transferring the color toner images transferred onto the intermediate transfer belt 16 by the primary transfer rollers 13Y, 13M, 13C, and 13Bk onto an image supporting medium P, and a cleaning unit 12 for collecting toners remaining on the intermediate transfer belt 16.

[Intermediate Transfer Belt]

The intermediate transfer belt 16 is an endless belt extending around and rotatably supported by a plurality of support rollers 16*a* to 16*d*.

The intermediate transfer belt 16 has a structure in which a specific surface layer formed of the cured resin according to the present invention is formed on the outer circumferential surface of a belt base composed of a semiconductive belt including a polyimide resin and a conductive filler dispersed therein.

For example, the thickness of the specific surface layer in the intermediate transfer belt 16 is preferably 5 to 30 μm.

The intermediate transfer belt 16 according to the present, invention has a surface resistivity of preferably $1\times10^{10}$ to $1\times10^{13}$ Ω/square.

If the surface resistivity is less than $1\times10^{10}$ Ω/square, blurred characters may be formed, on an image obtained. If the surface resistivity exceeds $1\times10^{13}$ Ω/square, primary-transfer unevenness may occur in an image obtained.

The surface resistivity is an average of resistance values measured after application of a voltage of 500 V for 10 seconds using a "Hiresta IP UP probe" (manufactured by Mitsubishi Chemical Corporation) at 12 points (3 points at constant intervals in a width direction×4 points in a vertical (circumferential) direction) in a room temperature and room humidity environment (temperature: 20±1° C., humidity: 50±2%).

The intermediate transfer belt 16 according to the present invention has a thickness of preferably 40 to 300 μm, more preferably 45 to 200 μm.

Any of various publicly known conductive fillers can be used as the conductive filler contained, in the intermediate transfer belt 16 according to the present invention. Examples of such conductive fillers include a powder of carbon black, short fibers of carbon black, carbon nanotubes, a powder obtained, by pulverizing graphite, short fibers of titanate, powders of metal-oxides such as Sb-doped tin oxide. In-doped tin oxide, and zinc oxide, and powders of conductive polymers such as polyaniline, polypyrrole, and polyacetylene. Specific examples of the carbon black include acetylene black, ketjen black, and acidic carbon.

The content of the conductive filler in the intermediate transfer belt 16 is generally preferably 1 to 35% by mass, more preferably 3 to 15% by mass with respect to the content of polyimide.

When the content of the conductive filler in the intermediate transfer belt 16 is within the above range, the intermediate transfer belt 16 can have a prescribed surface conductivity. However, if the content of the conductive filler in the intermediate transfer belt is excessively small, the surface resistivity may become excessively high. If the content of the conductive filler in the intermediate transfer belt is excessively large, the surface resistivity may become excessively-low.

The above-described intermediate transfer belt 16 has a surface formed of the specific cured resin, and wear resistance under frictional stress and separation stress can thereby be achieved. Therefore, even after the intermediate transfer belt 16 is used for a long period of time, the low-energy characteristics resulting from the fluorine-modified, acrylate (C) are not greatly impaired, and the initial surface characteristics are thereby maintained for a long period of time.

[Fixing Device]

The fixing device 30 includes a fixing belt and a pressure roller that are arranged so as to be pressed against each other to form a fixing nip portion N1. The fixing belt used is a heat generating fixing belt including; a resistance heat generating layer formed of, for example, a heat-resistant resin containing a conductive material dispersed therein; and a pair of electrodes for feeding power to the resistance heat generating layer.

Figure 2:
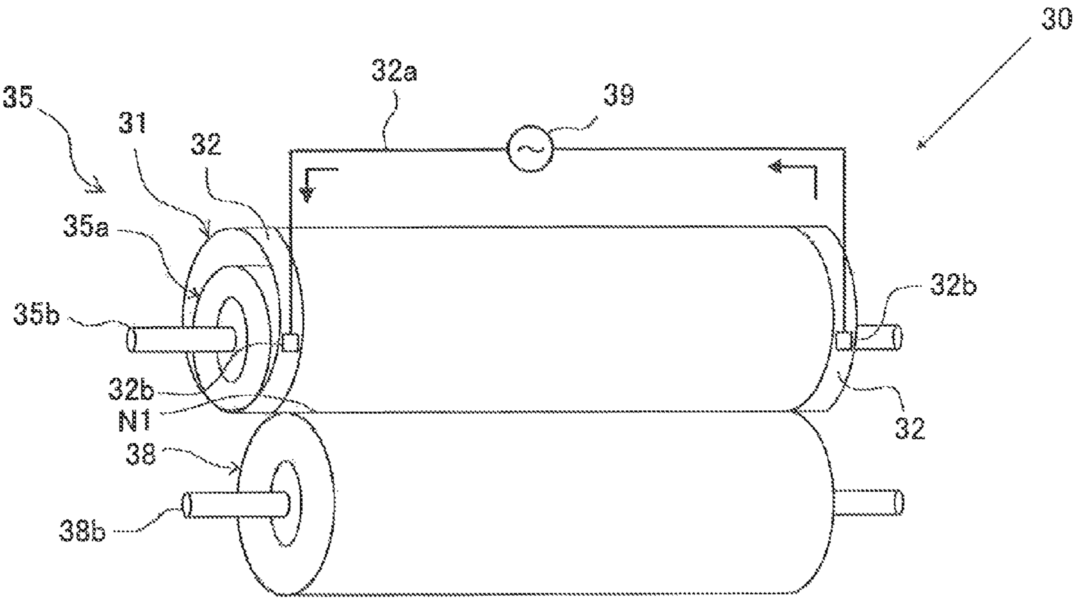
[FIG. 2] is a cross-sectional view illustrating an example of the configuration of a fixing device provided, in the image forming apparatus in FIG. 1.

More specifically,- as shown in FIG. 2, a refutable fixing assembly 35 that comes into contact with one face of an image supporting medium P on which images have been formed and a pressure roller 38 serving as another rotatable fixing assembly are pressed against each other. The rotatable fixing assembly 35 includes an endless heat generating fixing belt 31, and a nip portion forming roller 35*a* is disposed on the inner side of the heat generating fixing belt 31 such that the nip portion forming roller 35*a* and the pressure roller 38 are pressed against each other through the heat generating fixing belt 31. The fixing nip portion N1 is formed by the refutable fixing assembly 35 and the pressing section of the pressure roller 38.

In FIG. 2, reference numeral 35*b* represents the shaft of the nip portion forming roller 35*a*, and 38*b* represents the shaft of the pressure roller 38. Reference numeral 32*a* represents a lead wire.

In the fixing device 30 in the above example, the axial length of the pressure roller 38 is shorter than the axial length of the nip portion forming roller 35*a*, and the axial length of the heat generating fixing belt 31 is substantially the same as the axial length of the nip portion forming roller 35*a*. In addition, only the central section of the heat generating fixing belt 31 is in contact with and pressed against the pressure roller 38. A pair of electrodes 32 are provided at opposite ends of the heat generating fixing belt 31 that are not in contact with the pressure roller 38, and these electrodes 32 are connected, to a high frequency power source 39 through power feed members 32*b*.

[Heat Generating Fixing Belt]

The heat generating fixing belt 31 includes: a resistance heat generating layer formed of a neat resistant resin at least containing a conductive material dispersed therein; an elastic layer; and a specific surface layer formed of the cured resin according to the present invention, which are stacked in this order. The pair of electrodes 32 for feeding power to the resistance heat generating layer are disposed in contact with the resistance heat generating layer.

More specifically, the elastic layer is formed over the entire circumference of an axially central portion of the surface of the endless resistance heat generating layer in the circumferential direction, and the specific surface layer is formed on the surface of the elastic layer. The electrodes 32 are formed over surface regions of the resistance heat generating layer on which no elastic layer has been formed, i.e., over the entire axially opposite end regions in the circumferential direction, and a reinforcing layer is provided on the rear surface of the resistance neat generating layer.

The elastic layer and the reinforcing layer are optionally provided, and another functional layer may be provided in the heat generating fixing belt 31, if necessary.

The thickness of the specific surface layer in the heat generating fixing belt 31 is preferably, for example, 1 to 20 μm, more preferably 2 to 10 μm.

The resin forming the resistance heat generating layer in the neat generating fixing belt 31 contains a polyimide resin and may further contain an additional resin.

The additional resin is preferably a heat resistant resin, having a short-term heat resistance of 200° C. or higher and a long-term heat resistance of 200° C. or higher. As such a neat resistant resin, may be mentioned a polyphenylene sulfide resin (PPS), a polyarylate resin (PAR), a polysulfone resin (PSF), a polyether sulfone resin (PES), a polyether imide resin (PEI), a polyamide imide resin (PAI), and a polyether ether ketone resin (PEEK).

The additional resin nay be a non-neat resistant resin other than the above heat resistant resin, however, it is highly preferable that the content of the non-heat resistant resin is less than 40% by volume of the total volume of the resins forming the resistance heat generating layer.

The content of the polyimide resin in the resins forming the resistance heat generating layer is preferably 50% by volume or larger, particularly preferably 100% by volume.

Examples of the conductive material dispersed, in the resistance heat generating layer include: pure metals such as gold, silver, iron, and aluminum; alloys such as stainless steel and Nichrome; and non-metals such as carbon and graphite. Examples of the shape of the conductive material include a spherical powder shape, an irregular powder shape, a flat powder shape, and a fiber-shape.

Preferably, the conductive material dispersed in the resistance heat generating layer of the heat generating fixing belt 31 is graphite having a fiber shape, from the viewpoint of heat generating properties.

The fiber shape is a shape with, its major axis (L) longer than its minor axis (1) by at least a factor of 4.

The volume resistivity of the conductive material is preferably $1\times10^{-1}$ Ω·m or lower.

When the conductive material has a fiber shape, its volume resistivity is obtained as follows. A constant current I (A) is applied to the conductive material, and the potential difference V (V) across electrodes spaced apart by a distance L is measured. Then the volume resistivity is computed using the following formula (1).

$$\text{volume resistivity } \rho v=(V\cdot Wt)/IL \qquad \text{Formula (1):}$$

(wherein Wt is the cross sectional area of the conductive material.)

The content of the conductive material in the resistance heat generating layer is 5 to 60% by mass.

The thickness of the resistance heat generating layer is preferably 10 to 300 μm, more preferably 30 to 200 μm.

The volume resistivity of the resistance heat generating layer is preferably $8\times10^{-6}$ to $1\times10^{-2}$ Ω·m.

The volume resistivity of the resistance heat generating layer is determined as follows. Conductive tape electrodes are disposed on circumferential regions at opposite ends of the heat generating fixing belt 31, and the resistance across the opposite ends is measured. Then the volume resistivity is computed using the following formula (2).

$$\text{volume resistivity } \rho=(R\cdot d\cdot W)/L \qquad \text{Formula (2):}$$

(wherein R represents a resistance value (Ω), d represents the thickness (m) of the resistance heat generating layer, W represents the circumferential length (m) of the heat generating fixing belt 31, and L represents the distance (m) between the electrodes.)

The electrodes 32 disposed on the neat generating fixing Pelt 31 nave a layered structure. More specifically; each electrode 23 may be formed as follows. A ring-shaped electrode member formed, by electroforming, spinning, or drawing or an electrode member produced, for example, by laser-welding a metal sheet into a ring shape is attached, to a belt-shaped preform before firing performed to form the polyimide resin in the step of forming the resistance neat generating layer or to the resistance heat generating layer after firing. Each electrode 23 may be formed by applying a conductive tape.

The electrode members used to form the electrodes 32 may have holes formed by laser perforation processing or etching portions coming into contact with the resistance heat generating layer, in order to improve adhesion to the resistance heat generating layer. It is sufficient for each electrode member to be in contact with the resistance heat generating layer at one point. However, preferably, in consideration of conduction, stability, each electrode is in contact with the entire circumference of the resistance neat generating layer.

No particular limitation is imposed, on the electrode members for forming the electrodes 32. Preferably, electrode members formed of a material, such as Ni, SUS, Al, having low electrical resistivity, high heat, resistance, and high oxidation resistance are used.

The larger the thickness of the electrode members for forming- the electrodes 32, the higher the stiffness, and therefore the higher the fracture resistance. However, since such electrodes 32 are not easily deformed, the fixing nip portion N1 in the portion pressed against the pressure roller 38 is not easily formed. Therefore, in consideration of balance between the stiffness and flexibility, the thickness of the electrode members is preferably 10 to 100 μm, more preferably 30 to 60 μm.

For example, any of various carbon brushes formed of copper graphite, carbon graphite, etc. can be used as the power feed members 32*b*.

For example, power is fed to the resistance heat generating layer from the high frequency power source 39 through bundle wires or harnesses, the power feed members 32*b*, and the electrodes 32.

The power is fed from the power feed members 32*b* to the electrodes 32, for example, by bringing the power feed, members 32*b* into contact with only the electrodes 32. Specific examples of a method of establishing the contact include sliding contact and rolling contact using a roller.

The contact load between the power feed members 32*b* and the electrodes 32 is set such that conduction is established and no excessive stress is generated when the heat generating fixing belt 31 is driven.

The elastic layer included in the neat generating fixing belt 31 is optionally provided and is formed of, for example, an elastic heat resistant resin.

Examples of the elastic heat resistant resin include silicone rubber, natural rubber (NR), butadiene rubber (BR), acryionitrile butadiene rubber (NBR), hydrogenated NBR; (H-NBR), styrene-butadiene rubber (SBR), isoprene rubber (IR), urethane rubber, chloroprene rubber (CR), chlorinated polyethylene (Cl-PE), epihalohydrin rubber (ECO, CO), butyl rubber (IIR), an ethylene propylene diene polymer (EPDM), fluorocarbon rubber, and. acrylic rubber (ACM). Of these, CR, ECO, silicone rubber, butyl rubber, acrylic rubber, and urethane rubber are preferably used.

The thickness of the elastic layer is preferably 50 to 300 μm, more preferably 100 to 200 μm.

The reinforcing layer included, in the heat generating fixing belt 31 is optionally provided, and is formed of a heat resistant resin.

Examples of the heat resistant resin, forming the reinforcing layer include the above-described resins forming the resistance heat generating layer.

The thickness of the reinforcing layer is preferably 20 to 100 μm, more preferably 30 to 80 μm.

In the neat generating fixing belt 31 described above, since its surface is formed of the specific cured resin, wear resistance under frictional stress and separation stress is achieved. Therefore, even after the heat generating fixing belt 31 is used for a long period of time, the low-energy characteristics resulting from the fluorine-modified acrylate (C) are not greatly impaired, and the initial surface characteristics are thereby maintained for a long period of time.

[Image Forming Processing]

In the above-described image forming apparatus, first, the photosensitive elements 11Y, 11P, 11C, and 11Bk are electrified by the charging units 23Y, 23M, 23C, and 23Bk in the color toner image forming units 20Y, 20M, 20C, and 20Bk and then exposed to light from; the exposure units 22Y, 22M, 22C, and 22Bk, and electrostatic latent images are thereby formed. Then the electrostatic latent images are developed with toners in the developing units 21Y, 21M, 21C, and 21Bk, and respective color toner images are thereby formed. These color toner images are sequentially transferred onto the intermediate transfer belt 16 by the primary transfer rollers 13Y, 13M, 13C, and 13Bk and superimposed on the intermediate transfer belt 16, and toner powder layers including unfixed toners are thereby formed. An image supporting medium P stored in a sheet cassette 41 is fed through a sheet conveying unit 42 and conveyed by a plurality of feed rollers 44*a*, 44*b*, 44*c*, and 44*d* and resist rollers 46, and the toner powder layers on the intermediate transfer belt 16 are transferred onto the image supporting medium P by the secondary transfer roller 13A at once. Then the toner powder layers transferred onto the image supporting medium P are pressurized and heated in the fixing device 30, and toner layers are thereby formed.

The toner powder layers transferred onto the image supporting medium P are layers of a black toner image, a cyan toner image, a magenta toner image, and a yellow toner image stacked on the image supporting medium P in that order.

After the color toner images are transferred onto the intermediate transfer belt 16, toners remaining on the photosensitive elements 11Y, 11M, 11C, and 11Bk are removed by the cleaning units 25Y, 25Mb 25C, and 25Bk, and the cleaned photosensitive elements 11Y, 11M, 11C, and 11Bk are used for the formation of the next color toner images.

After the color toner images are transferred onto the image supporting medium P by the secondary transfer roller 13A, toners remaining on the intermediate transfer belt 16 are removed by the cleaning unit 12, and the cleaned intermediate transfer belt 16 is used for intermediate transfer of the next color toner images.

[Developer]

A developer used in the image forming apparatus in the present invention may be a one-component developer including a magnetic or non-magnetic toner or a two-component developer including a mixture of a toner and a carrier.

No particular limitation is imposed on the toner contained in the developer, and any of various publicly known toners may be used. For example, a so-called polymerised toner obtained by polymerization and having a volume-based median diameter of 3 to 9 μm is preferably used. The use of the polymerized toner allows images formed to have high resolution and stable image density and can significantly prevent the occurrence of image fogging.

No particular limitation is imposed, on the carrier used to prepare a two-component developer, and any of various publicly known carriers can be used. For example, a ferrite carrier formed of magnetic particles having a volume-based median diameter of 30 to 65 μm and a magnetization of 20 to 70 emu/g is preferred. If a carrier having a volume-based median diameter of less than 30 μm is used, adhesion of the carrier may occur, causing picking on images. If a carrier having a volume-based median diameter of larger than 65 μm is used, an image with uniform image density may not be formed.

[Image Supporting Medium]

Examples of the image supporting medium P used in the image forming apparatus of the present invention include, but not limited to: various types of printing paper such as thin ordinary paper, thick ordinary paper, high-quality paper, coated printing paper, for example, art paper and coated paper, commercial Japanese paper, and commercial postcard paper; OHP plastic films; and cloths.

Although the embodiment of the present invention, has been specifically described, but the embodiment of the present invention is not limited to the above-described examples, and various modifications can be made thereto.

For example, the image forming apparatus of the present invention may include at least one member including the belt member of the present invention.

The fixing device including the belt member of the present invention is not limited to the belt member of the heat generating type described above. For example, the belt member may be of the heat roller type or the belt heating type.

The fixing device of the heat roller type and the fixing device of the belt heating type will next be described.

(i) Fixing Device of Heat Roller Type

Generally, the fixing device of the neat roller type includes a pair of rollers including a heating roller and a pressure roller abutting against the heating roller. The pressure generated between the heating roller and the pressure roller causes the pressure roller to deform, and a so-called fixing nip portion is thereby formed in the deformed portion.

Generally, the heating roller includes a metal core or a hollow metal roller formed of, for example, aluminum, and a heat source such as a halogen lamp disposed inside the metal core. The metal core is heated by the heat source. In this case, the power fed to the heat source is controlled to control the temperature of the metal core such that the outer circumferential surface of the heating roller is maintained at a prescribed fixing temperature.

Particularly, when the fixing device is used in an image forming apparatus that forms full-color Images and is required to have an ability to sufficiently heat and melt toner images including up to 4 toner layers to mix colors, it is preferable to use a heating roller including: a metal core having high heat capacity; and an elastic rubber layer formed, on the outer circumferential surface of the metal core to melt the toner images uniformly.

The heating roller has a structure including, as its outermost layer, a specific surface layer formed, of the cured resin according to the present invention. The thickness of the specific surface layer in the heating roller is, for example, 10 to 30 μm.

The pressure roller includes an elastic layer formed of, for example, a soft rubber such as urethane rubber or silicon rubber.

A pressure roller including a metal core such as a hollow metal roller formed of, for example, aluminum and an elastic layer formed on the outer circumferential surface of the metal core may also be used.

Preferably, the outermost layer of the pressure roller used, is an antisticking layer formed of, for example, a fluorocarbon resin such as polytetrafluoroethyiene (PTFE) or a tetrafluoroethylene-perfluoroalkyl vinyl ether copolymer (PFA). The thickness of the antisticking layer may be about 10 to 30 μm.

When, the pressure roller is configured to include a metal core, a heat source such as a halogen lamp may be disposed inside the pressure roller, as in the heating roller. In this case, the metal core is heated by the heat source, and the power fed to the heat source is controlled to control the temperature of the metal core such that the outer circumferential surface of the pressure roller is maintained at a prescribed fixing temperature.

In the above fixing device of the heat roller type, the pair of rollers are rotated to cause the fixing nip portion to hold and convey an image supporting medium on which a visible image is to be formed. Then the image supporting medium, is heated by the heating roller and pressed in the fixing nip portion, and the unfixed toner images are thereby fixed, onto the image supporting medium.

(ii) Fixing Device of the Belt Heating Type

Generally, the fixing device of the belt heating type includes a heating member including, for example, a ceramic heater, a pressure roller, and a neat fixing belt such as a heat resistant belt sandwiched between the heating member, and the pressure roller. The pressure generated between the heating member and the pressure roller causes the pressure roller to deform., and a so-called fixing nip portion is formed in the deformed portion.

The heat fixing belt has a structure in which a specific surface layer formed of the cured resin according to the present invention is formed on a belt base including a heat resistant belt formed of, for example, polyimide. An elastic layer formed of, for example, a rubber may be provided between the belt base and the specific surface layer.

The thickness of the specific surface layer in the heat fixing belt is, for example, 1 to 5 μm.

In the above fixing device of the belt heating type, an image supporting medium supporting unfixed toner images together with the heat fixing belt is held between the heat fixing belt and the pressure roller that form the fixing nip portion and is then conveyed therethrough. Then the image supporting medium is heated by the heating member through the heat fixing belt, and pressure is applied to the image supporting medium in the fixing nip portion. The unfixed toner images are thereby fixed, onto the image supporting medium.

EXAMPLES

Specific examples of the present invention will next be described, but the present invention is not limited thereto.

Belt Member Production, Example 1

(1) Production of Endless Belt-shaped Base

Dried oxidation-treated carton black "SPECIAL BLACK4" (manufactured by Degussa, pH: 3.0, volatile component: 14%) was added to "U-Varnish S (solid content: 18% by mass)" (manufactured by Ube Industries, Ltd,) being an N-methyl-2-pyrrolidone (NMP) solution of polyamic acid produced from 3,3',4,4'-biphenyltetracarboxylic acid dianhydride (BPDA) and p-phenylenediamine (PDA), such that the amount of the carbon black was 23 parts by mass per 100 parts by mass of the solid polyimide-based resin. Then the mixture was placed in a collision-type dispersing apparatus "Geanus PY" (manufactured by Geanus) and caused to pass through a path in which the mixture was divided, into two portions and the divided portions were brought into collision with each other at a pressure of 200 MPa and a minimum area of 1.4 $mm^2$. The mixture was caused, to pass through this path for dividing into two portions 5 times and then mixed, and a polyamide acid solution containing the carbon black was thereby obtained.

The polyamide acid solution containing the carbon black was applied to the inner circumferential surface of a cylindrical metal die to 0.5 mm using a dispenser, and the die was rotated at 1,500 rpm for 15 minutes to form a spread layer having a uniform thickness. While the die was rotated at 250 rpm, hot air at 60° C. was applied to the outer circumference of the die for 30 minutes, and then the die was heated at 150° C. for 60 minutes. Then the die was heated to 360° C. at a temperature rise rate of 2° C./minutes and held at 360° C. for 30 minutes to remove the solvent and water generated by dehydration cyclization and to complete an imide conversion reaction. The coating was cooled to room temperature and separated from the cylindrical metal die, and an endless belt-shaped base having a thickness of 0.1 mm was thereby produced.

(2) Preparation of Surface Layer-forming Coating Solution

Component (A): 63 parts by mass of urethane acrylate "U-6LPA" (manufactured by Shin Nakamura Chemical Co., Ltd.), Component (B): 27 parts by mass of dipentaerythritol hexaacrylate (DPHA), Component (C): 10 parts by mass of fluorine-modified acrylate "MEGAFAC RS-72-K" (manufactured by DIC corporation), and Component (D): 5 parts by mass of 1-hydroxycyclohexyl phenyl ketone were dissolved in a solvent which is propylene glycol monomethyl ether acetate (PMA) such that the solid content was 10% by mass to thereby prepare a surface layer-forming coating solution (1).

(3) Formation of Surface Layer

The outer circumferential surface of the above endless belt-shaped base was coated with the surface layer-forming coating solution (1) to a dry thickness of 5 μm using a coating apparatus by means of a dip coating method under the following coating conditions to thereby form a coating. Then the coating was irradiated with UV rays used as active energy rays under the following irradiation conditions to cure the coating. A surface layer was thereby formed, and a belt member [1] was obtained. The UV rays were applied with the light source fixed while the endless belt-shaped, base having the coating formed thereon was rotated at a circumferential velocity of 60 mm/s.

—Coating Conditions—

Coating solution supply rate: 1 L/min

Drawing-up speed: 4.5 mm/min

Belt members [2] to [7] were produced as in belt member production example 1 except that, in the surface layer-forming coating solution preparing step, surface layer-forming coating solutions were prepared according to prescriptions shown in TABLE 1 and the these prepared coating solutions were used in the surface layer forming step.

[Evaluation 1: Durability]

Against the above-obtained belt members [1] to [7], a rubber blade with fine titanium oxide particles (an abrasive) provided on the surface of its end was pressed, and the belt members were subjected to friction wear treatment while the belt member was rotated for 1,000 sec to apply stress on the surface of the belt member. Then the angle of contact (x) on the surface of the belt member was measured, and durability was evaluated according to the angle of contact (x). The results are shown in TABLE 1.

When the angle of contact (x) was 85° or larger, it was evaluated that no toner offset or only slight toner offset would occur, and the durability was evaluated as "pass." When the angle of contact (x) was 80° or larger and smaller than 85°, it was evaluated that toner offset would occur but would not cause any practical problems. When the angle of contact (x) was smaller than 80°, it was evaluated that toner offset would, cause practical problems. In the present invention, both the cases were evaluated regarding the durability as "fail."

[Evaluation 2: Coating Strength]

Against the above-obtained belt members [1] to [7], a rubber blade with fine titanium oxide particles (an abrasive) provided on the surface of its end was pressed, and the belt members were subjected to friction wear treatment while the belt member was rotated for an appropriate time to apply stress on the surface of the belt member. Then the belt member was used as a fixing belt to form an image. The coating strength was evaluated according to the presence or absence of image defects in the obtained image caused by flaws on the surface layer generated by the stress. The results are shown in TABLE 1. Only when the evaluation rating was "A," the coating strength was evaluated as "pass."

—Evaluation Criteria—

A: No image defects due to flaws were formed even after stress was applied for 3,000 sec or longer.

B: Image defects due to flaws were formed after stress was applied for 3,000 sec.

C: Image defects due to flaws were formed after stress was applied for shorter than 3,000 sec.

TABLE 1

| | | SPECIFIC CURED RESIN | | | EVALUATION RESULTS | |
|---|---|---|---|---|---|---|
| | BELT MEMBER No. | COMPONENT (A) | COMPONENT (B) PARTS BY MASS | COMPONENT (C) | DURABILITY (CONTACT ANGLE x) | COATING STRENGTH |
| EXAMPLE 1 | 1 | 27 | 63 | 10 | 85 < x | A |
| EXAMPLE 2 | 2 | 18 | 42 | 40 | 85 < x | A |
| COMPARATIVE EXAMPLE 1 | 3 | 20 | 20 | 60 | 80 ≤ x < 85 | B |
| COMPARATIVE EXAMPLE 2 | 4 | 90 | 5 | 5 | 80 ≤ x < 85 | A |
| COMPARATIVE EXAMPLE 3 | 5 | 5 | 90 | 5 | x ≤ 80 | C |
| COMPARATIVE EXAMPLE 4 | 6 | 80 | 10 | 10 | 80 ≤ x < 85 | B |
| COMPARATIVE EXAMPLE 5 | 7 | 10 | 80 | 10 | 80 ≤ x < 85 | C |

—UV Irradiation Conditions—

Type of light source: High pressure mercury lamp "H04-L41" (manufactured by EYE GRAPHICS Co., Ltd.)

Distance from irradiation port to surface of coating: 100 mm

Irradiation light amount: 1 J/cm$^2$

Irradiation time (time of rotation of base): 240 seconds

REFERENCE SIGNS LIST

10 intermediate transfer unit

11Y, 11M, 11C, 11Bk photosensitive element

12 cleaning unit

13Y, 13M, 13C, 13Bk primary transfer roller

13A secondary transfer roller

16 intermediate transfer belt
16*a* to 16*d* support roller
20Y, 20M, 20C, 20Bk color toner image forming unit
21Y, 21M, 21C, 21Bk developing unit
22Y, 22M, 22C, 22Bk exposure unit
23Y, 23M, 23C, 23Bk charging unit
25Y, 25M, 25C, 25Bk cleaning unit
30 fixing device
31 heat generating fixing belt
32 electrode
32*a* lead wire
32*b* power feed member
35 rotatable fixing assembly
35*a* nip portion forming roller
35*b* shaft
38 pressure roller
38*b* shaft
39 high frequency power source
41 sheet cassette
42 sheet, conveying unit
44*a*, 44*b*, 44*c*, 44*d* feed roller
46 resist roller
N1 fixing nip portion
P image supporting medium

The invention claimed is:

1. A belt member included in an electrophotographic image forming apparatus, the belt member comprising:

a surface formed of a cured resin including a structural, unit derived from urethane (meth)acrylate (A) having at least three (meth)acryloyloxy groups per molecule, a structural unit derived from a polyfunctional monomer (B) having no urethane bond and having at least three (meth) acryloyloxy groups per molecule, and a structural, unit derived from a fluorine-modified acrylate (C), wherein the cured resin contains 18 to 63% by mass of the structural unit derived from the urethane(meth)acrylate (A), 18 to 63% by mass of the structural unit derived from the polyfunctional monomer (B), and 10 to 40% by mass of the structural unit derived from the fluorine-modified acrylate (C).

2. The belt member according to claim. 1, wherein the urethane (meth)acrylate (A) is obtained by reacting a polyol compound (a1) having at least two hydroxyl groups per molecule, a polyisocyanate compound (a2), and an acrylate compound (a3) having a hydroxyl group and an acryloyloxy group per molecule.

3. The belt member according to claim 2, wherein the polyol compound (a1); is a cyclic alcohol having a skeleton formed of an alicyclic hydrocarbon.

4. The belt member according to claim 1, wherein the fluorine-modified acrylate (C) has an average molecular weight of 10,000 or larger.

5. The belt member according to claim 1, further comprising: a belt base having a belt shape and formed of a polyimide resin; and a surface layer formed on the belt base, the surface layer being formed of the cured resin.

6. A fixing device, comprising: a fixing belt and a pressure roller that are disposed in pressure contact with each other to form, a fixing nip portion, wherein the fixing belt comprises the belt member according to claim 1.

7. An image forming apparatus, comprising the fixing device according to claim 6.

8. An image forming apparatus, comprising: an image carrier; an intermediate transfer belt that moves in a circulating manner; a primary transfer unit for transferring a toner image electrostatically formed on the image carrier onto the intermediate transfer belt to form an intermediate toner image; and a secondary transfer unit for transferring the intermediate toner image formed on the intermediate transfer belt, onto a transfer medium, wherein the intermediate transfer belt comprises the belt member according to claim 1.

* * * * *